United States Patent
Bennett et al.

(10) Patent No.: US 11,373,170 B1
(45) Date of Patent: Jun. 28, 2022

(54) CUSTOM MEMPOOL PROTOCOL ASSOCIATED WITH PROCESSING OF CRYPTOGRAPHIC EVENTS

(71) Applicant: DMG Blockchain Solutions Inc., Vancouver (CA)

(72) Inventors: Sheldon Bennett, Surrey (CA); Adrian Glover, Surrey (CA)

(73) Assignee: DMG BLOCKCHAIN SOLUTIONS, INC.

( * ) Notice: Subject to any disclaimer, the term of this patent is extended or adjusted under 35 U.S.C. 154(b) by 0 days.

(21) Appl. No.: 17/399,332

(22) Filed: Aug. 11, 2021

Related U.S. Application Data

(60) Provisional application No. 63/177,217, filed on Apr. 20, 2021.

(51) Int. Cl.
| | |
|---|---|
| *H04L 29/06* | (2006.01) |
| *G06Q 20/36* | (2012.01) |
| *H04L 9/32* | (2006.01) |
| *G06Q 20/38* | (2012.01) |

(52) U.S. Cl.
CPC ....... *G06Q 20/367* (2013.01); *G06Q 20/3827* (2013.01); *H04L 9/3236* (2013.01); *H04L 9/3247* (2013.01); *G06Q 2220/00* (2013.01); *H04L 2209/38* (2013.01); *H04L 2209/56* (2013.01)

(58) Field of Classification Search
CPC ............. G06Q 20/367; G06Q 20/3827; G06Q 2220/00; H04L 9/3236; H04L 9/3247; H04L 2209/38; H04L 2209/56
See application file for complete search history.

(56) References Cited

U.S. PATENT DOCUMENTS

| | | | |
|---|---|---|---|
| 11,153,097 B1* | 10/2021 | Griffin | H04L 9/3239 |
| 2017/0046806 A1* | 2/2017 | Haldenby | G06Q 20/102 |
| 2018/0109541 A1 | 4/2018 | Gleichauf | |
| 2018/0247191 A1 | 8/2018 | Katz et al. | |
| 2019/0279215 A1 | 9/2019 | Kuchar et al. | |
| 2019/0386817 A1* | 12/2019 | Carson | G06F 21/64 |
| 2020/0076823 A1* | 3/2020 | Coonrod | H04W 12/63 |
| 2020/0133926 A1* | 4/2020 | Sun | H04L 9/0637 |
| 2020/0396065 A1 | 12/2020 | Gutierrez-Sheris | |

(Continued)

OTHER PUBLICATIONS

Deneuville, Marion, "An in-depth guide into how the mempool works" (4 pages).

(Continued)

*Primary Examiner* — Ghodrat Jamshidi
(74) *Attorney, Agent, or Firm* — Perkins Coie LLP; Colin Fowler

(57) ABSTRACT

Systems and methods for processing events transmitted by an application to hashing processors executing a custom mempool protocol that is independent of the public blockchain protocol. Events transmitted by the application are hashed only into blocks with other events transmitted by the application or events with parameters satisfying a screening criterion and are not propagated to mempools of nodes that are not executing the custom mempool protocol. The blocks are appended to the blockchain according to the public blockchain protocol. Thus, application users exercise intentionality over which hashing processors process their events and which other events will be hashed into a block with the users' events.

14 Claims, 8 Drawing Sheets

(56) References Cited

U.S. PATENT DOCUMENTS

| | | | | |
|---|---|---|---|---|
| 2021/0194672 A1* | 6/2021 | Narayanam | ............ | G06F 21/645 |
| 2021/0194698 A1* | 6/2021 | Yu | ........................ | H04L 9/0643 |
| 2021/0224334 A1* | 7/2021 | Shrinivasan | ........ | G06F 16/2272 |
| 2021/0365940 A1* | 11/2021 | Tietzen | .............. | G06Q 20/4015 |
| 2021/0398143 A1* | 12/2021 | Park | ................... | G06F 16/9035 |

OTHER PUBLICATIONS

Mastering the Mempool: Your Intro to In-Flight Transactions.
Tales from the Crypt: A Bitcoin Podcast, Rabbit Hold Recap: Week of Jul. 6, 2020, Jul. 6, 2020.
Dos Santos, Saulo, et al., "An Efficient Miner Strategy for Selecting Cryptocurrency Transactions", downloaded from https://ieeexplore.ieee.org/stamp/stamp.jsp?tp=&arnumber=8946174, attached as PDF file, dated 2019 (Year: 2019), 8 pp.
Hinkes, Andrew, et al., "OFAC'S Proposed Virtual Currency Blacklist Could Complicate Sanctions, Crypto Compliance", dated Mar. 29, 2018, V downloaded from https://www.acfcs.org/ofacs-proposed-virtual-currency-blacklist-could-complicate-sanctions-crypto-compliance/and attached as PDF file (Year: 2018), 26 pp.
Ipeirotis, Panos, "Analyzing the Amazon Mechanical Turk Marketplace", predating 2012 downloaded from https://archive.nyu.edu/bitstream/2451/29801/4/CeDER-10-04.pdf attached as PDF file; Wayback screen shot also provided for date proof (Year: 2012), 17 pp.
Lee, Seunghyeon, et al., "Cybercriminal Minds: An Investigative Study of Cryptocurrency Abuses in the Dark Web", dated 2019, downloaded from https://www.ndss-symposium.org/wp-content/uploads/2019/02/ndss2019_09-1_Lee_paper.pdf and attached as PDF file (Year: 2019), 15 pp.

* cited by examiner

CUSTOM MEMPOOL PROTOCOL ASSOCIATED WITH PROCESSING OF CRYPTOGRAPHIC EVENTS

CROSS-REFERENCE TO RELATED APPLICATIONS

This application claims priority to U.S. Patent Application No. 63/177,217, filed on Apr. 20, 2021, which is incorporated herein in its entirety by this reference thereto.

TECHNICAL FIELD

The disclosure relates to operation of a pool of hashing processors and more particularly to structural requirements of forming blocks in a blockchain data structure.

BACKGROUND

Some blockchains systems record movement of cryptographic objects between cryptographic identifiers and operate on distributed consensus networks. A blockchain is an immutable, append-only public ledger. A benefit of such a data structure is that is reliable, secure, and open. However, one of the benefits, specifically the anonymity of transaction has attracted criminals to the platform. Within the distributed consensus networks, there tend to be congregations of processing power referred to as pools. The pools use ASIC processors designed for hashing to more efficiently generate the block data structures from available events.

DETAILED DESCRIPTION

Figure 1:
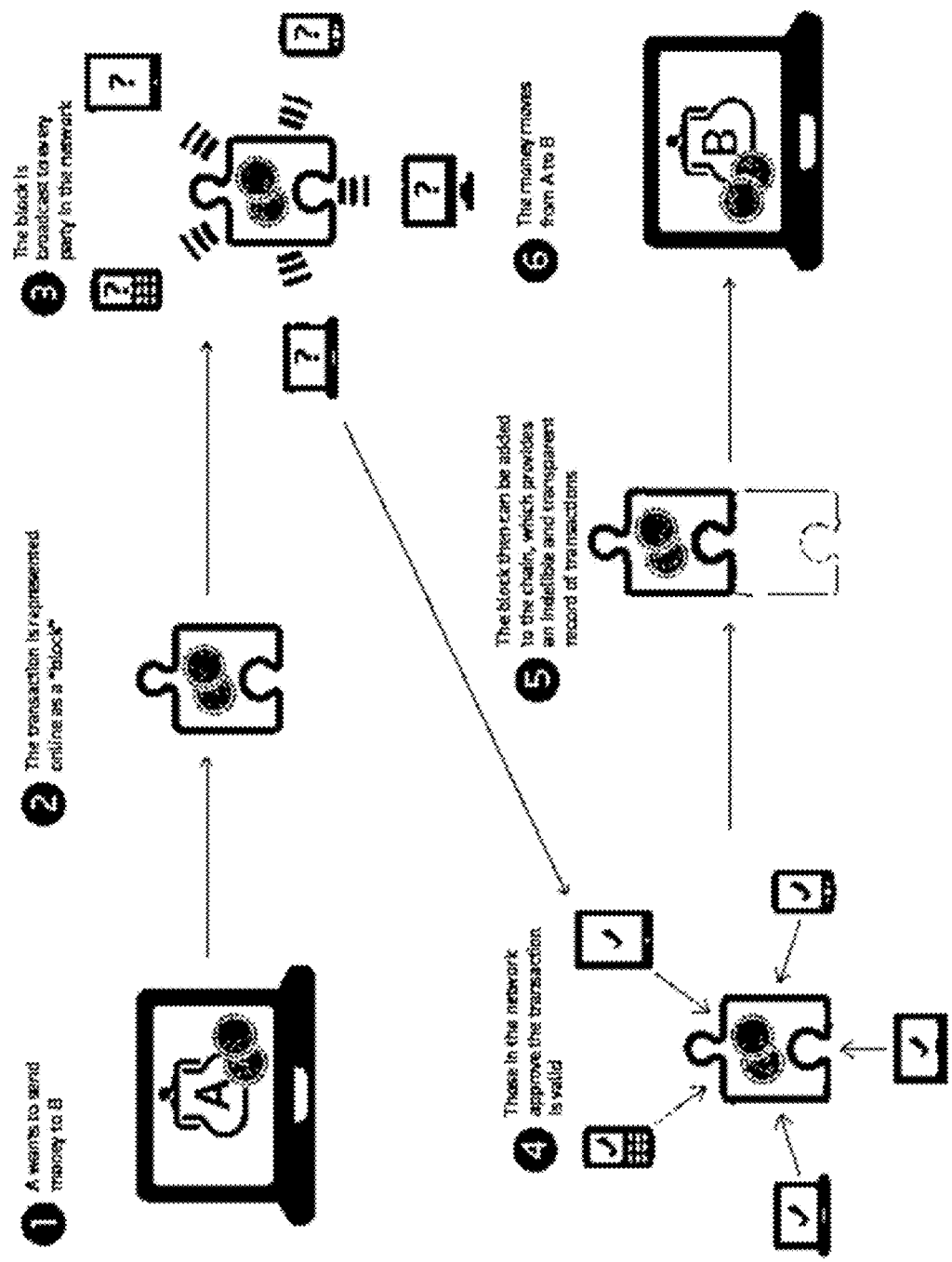
FIG. 1 is a block diagram of a blockchain data structure.

In block creation, a miner generally requests a "block template" from a full node on a distributed consensus network. This block template will have a list of events that exist in the mempool. The mempool is where all valid events wait to be confirmed by the entire distributed consensus network. Described herein a filter node will review the list of events, looping through each one as new events are added, and create a list of all the cryptographic identifiers that are associated with each event. The filter node applies a custom protocol to a given node on a public blockchain (e.g., Bitcoin, Ethereum, etc.). The custom protocol is independent of and compatible with the public blockchain protocol. The custom protocol affects how a given node (or set of nodes) behaves and interacts with the greater distributed consensus network; however, the custom protocol does not interfere with the ability of the given node to interact with the public blockchain protocol. As used herein, nodes and hashing processors are also known as miners.

The list of cryptographic identifiers is used to make a query to a labels database and will receive a list of which of these cryptographic identifiers has a criminality score of 1. The addresses that meet these criteria will be mapped to their respective events and these specific events are relayed to the pool of hashing processors ("miners") and excluded from the next mined block generated by the pool. In some embodiments, these specific events that were excluded or avoided will still exist in the mempool and will either be again excluded in the future by pool of miners or confirmed and mined in a block by another pool or independent miner.

The emergence of cryptographic objects has posed problems for regulatory bodies. In some circumstances, it behooves users to cooperate with those regulatory bodies. In those circumstances, the distributed nature of the cryptographic objects impedes the ability to comply. An AddressScore measures an address's propensity to engage in criminal or suspicious activity.

Naturally, transacting with a criminal is tantamount either to funding crime or laundering its proceeds, so it is in the collective interest to identify—and then monitor or quarantine—any wallet with criminal association. Applied further, where hashing pools refuse to validate the actions of criminals (by excluding or blacklisting criminal addresses from inclusion into blocks), the system makes it more difficult for criminals to operate on the relevant distributed consensus network.

To vet an existing customer, an exchange or hashing pool (for example) would run AddressScore against the addresses associated with events in the mempool. In some embodiments, AddressScores are a value between 0 (safe) and 1 (criminal). The value may be a simple binary indicator, or a more nuanced scale. AddressScores may also be expressed as labels. A label is a human readable tag describing what an address has been used for (i.e., Drug trafficking), or who is the owner of a particular address (i.e., Exchange). Exchange's may be considered a 0, whereas Drug trafficking would fall under the criminal activity category and be given a risk of 1.

A filtering node associated with a hashing pool leverages the AddressScore in order to build OFAC compliant blocks with its pool software. This means that the blocks that the filtering node and hashing pool software mine exclude transactions that include any address that meet some threshold AddressScore (e.g., 1, 0.5, 0.6, 0.7, etc. . . . ).

Labels are collected from a variety of sources. The main 3 sources are, government new releases and web sites, publicly available bitcoin blockchain explorer web sites, and Mechanical Turks.

In some embodiments, labels are generated based on a web crawler that scrapes data and applies the relevant label and AddressScore to the address. The crawlers monitor different web sites that provide information related to specific cryptographic identifiers. These web sites vary from government-owned and exchange owned, to blockchain explorers.

In some embodiments, labels are generated through the use of Mechanical Turks. The Mechanical Turks operate campaigns where workers are incentivized to provide screenshots of cryptographic identifiers related to a particular exchange. These addresses tend to be labelled as exchange and usually have an AddressScore of 0. In addition to the methods mentioned, in some embodiments, a web crawler applying a natural language processor seeks find news articles that have information that may lead to input into the database of a given address. Any combination of the described sources used are added to the database along with the address, label, AddressScore, and a confidence level.

Terminology

An entity is any person or company, or merely a reference to either, that owns the private keys to a public address (cryptographic identifier). Examples are: Mrs. Jones, Binance Exchange, 2016 Bitfinex Thief.

The Bitcoin mempool (short for memory pool) is a collection of all Bitcoin transactions ("event") awaiting verifications and confirmation which will be included in the next block. Whenever a Bitcoin transaction is channeled to the network, it first gets verified by all the Bitcoin nodes available, which takes an average of 10 minutes to get its first verification. It can take longer than 10 minutes, depending on the pending transactions that are in the mempool. Mempool is the node's maintaining and restraining area that focuses on transactions awaiting approval. When one transaction gets verified and included, the next one is in line to get added. Cryptocurrencies other than Bitcoin operate using mempools as well. Bitcoin is referenced here as an example.

The collection of these transactions is called a "block" and whichever miner first solves the math problem gets to add this block to Bitcoin's blockchain. However, if the size of the Bitcoin mempool is high, transaction fees recommended by exchanges go up to improve the rate. A given user is enabled to choose how expensive they wish to transaction fee to be. If one sets the fee higher than average, chances are that transaction will be confirmed quicker. Failing to attach high fees could result in a transaction being delayed for many days if the memory pool does not clear.

An Exchange is an entity that operates a plurality of addresses. Even though a customer of an exchange is given a deposit address, the address is truly owned by the exchange rather than by the customer, since the exchange controls the private keys to that address.

Each entity belongs to one of a definitive set of categories. Some illustrative examples include: exchange, gambling site, dark market, scammer or mixer. A category may be assigned a degree of criminality that in some embodiments, affect an initial AddressScore. For instance, the dark market category receives a high initial score (e.g., near or above a criminality threshold), whereas a law enforcement agency a and private individuals have an inherent score of 0. An entity belonging to a category that has a higher initial score carries some intrinsic risk. Otherwise, it derives extrinsic risk from nearby entities having intrinsic risk.

A wallet is the set of addresses (or cryptographic identifiers) belonging to a single entity (or set of entities, to accommodate multisig addresses). In some instances, an entity has multiple wallets, as in the case of an exchange that stores some value in "cold" storage wallets, and some in "hot" storage. In a similar fashion to entities, wallets have either intrinsic or extrinsic risk.

Although one can partition addresses into wallets, there is difficulty identifying the entities that own them. However, the system can sometimes identify at least the category of the (unknown) entity that owns the wallet. Clues about the wallet's category often come from topological properties about its transactions. For example, to the extent that a given transaction exemplifies mixing, the system can then further infer that the input and output addresses belong to a mixer.

Finally, we define hops among entities (or wallets). Two entities are one hop from each other precisely when there exists a single transaction between them. This forms a directed graph of entities. We say that entities that are n hops away from one another if the shortest path connecting them (ignoring direction) has n edges.

A wallet's transactional neighborhood is the set of wallets that have transacted with the given wallet, plus those that have transacted with that wallet's transactors, and so on. While there is no strict limit to the number of hops that constitute the neighborhood, an intuitively definition is "less than the entire network of wallets, and more than just a single wallet."

FIG. 1 is a block diagram of a blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history of at least a majority of other nodes. This consistency rule has an important effect of causing the blockchain to be immutable. In order to effectively attack a blockchain, one must control 51%+ of the processing power of the entire network. Where the network is comprised of thousands of nodes, assembling the requisite 51% is exceedingly difficult.

Many nodes tend to group together to form pools. Often these pools operate large warehouses of ASIC hashing processors, specifically designed to efficiently solve math problems that generate hash values. While it is true that many nodes often group together in pools that together work together to solve for nounces to propagate the blockchain, the grouped nodes of the pool do not necessarily share common control. While they have agreed to pay any mined coins to a central pot that is shared amongst the pool, this is far and away from agreeing to make changes to the blockchain.

When a given node intends to generate a transaction, the transaction is propagated throughout the nodes, via the mempool, until it reaches a node or group of nodes that can assemble that transaction and other transactions generated during a contemporaneous period of time into a block. Until a transaction appears in a block it is not published or public. Often a transaction isn't considered confirmed until 6 additional blocks have been added.

At the time of this filing, Bitcoin blocks are limited to the size of 1 MB and are generated approximately every 10 to 15 minutes. This illustrates an important limitation of the Bitcoin network, that it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not verified.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect software that runs on the blockchain. That software is open source and subject to inputs that are related to the blockchain itself. Of course, one can still write code including vulnerabilities, but the platform enables greater security and fewer weak links in the chain.

Figure 2:
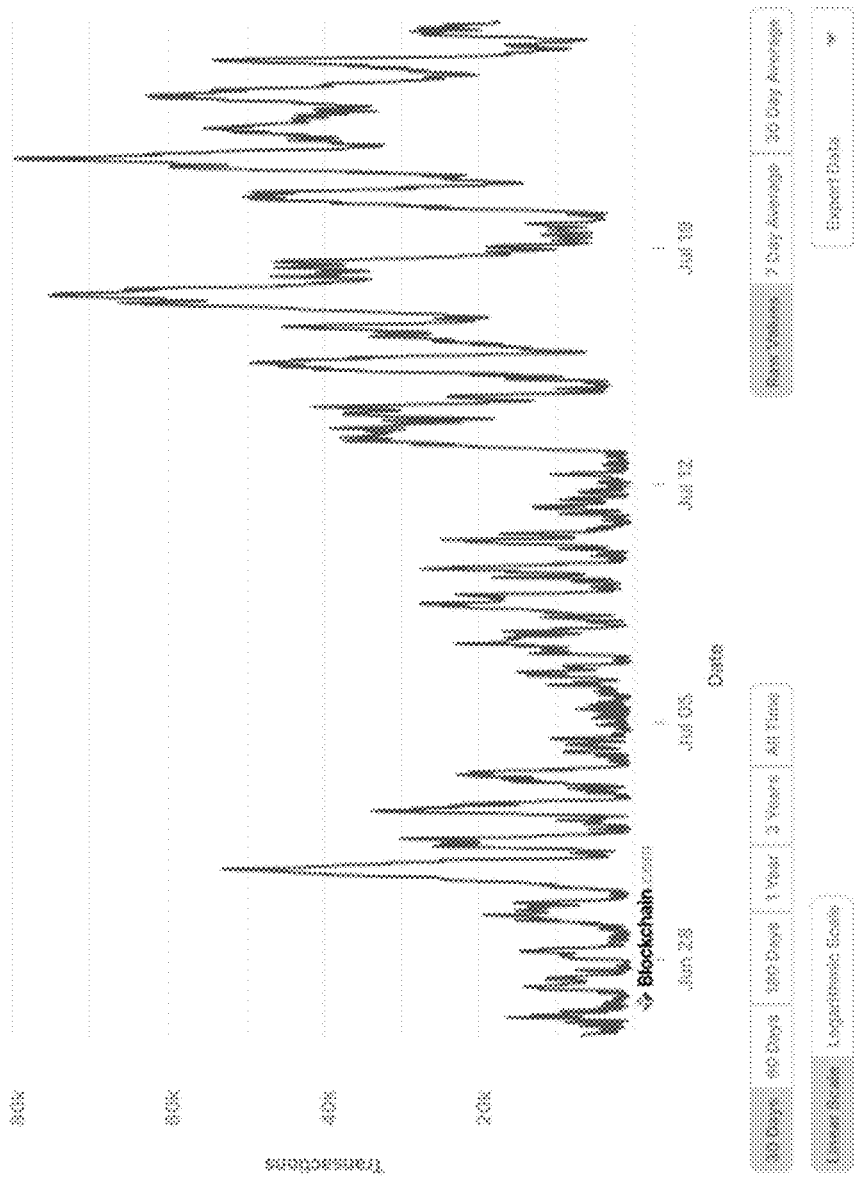
FIG. 2 is an illustration of a mempool.

FIG. 2 is an illustration of the Bitcoin mempool over time. The Bitcoin mempool is portrayed here as an example. Other cryptographic objects make use of similar mempools. The mempool is where all valid transactions wait to be confirmed by the cryptographic object network. A high number of transactions in the mempool indicates a congested traffic which will result in longer average confirmation time and higher priority fees. The mempool count metric tells how many transactions are causing the congestion whereas the mempool Size (Bytes) chart is a better metric to estimate how long the congestion will last.

In order to be confirmed, a transaction from the mempool needs to be included in a block. Unlike the maximum size of a block which is fixed, the maximum number of transactions which can be included in a block varies, because not all transactions have the same size.

Each Bitcoin node builds its own version of the mempool by connecting to the Bitcoin network. The illustrated mempool content is aggregated from a few instances of up to date Bitcoin nodes maintained by the Blockchain.com engineering team. However, in a disclosed filter node the mempool may look different based on the treatment of high AddressScore transactions/events.

In some embodiments, the filter node's mempool discards those transactions/events that include cryptographic identifiers with above threshold AddressScores. In other embodiments, those transactions remain in the mempool until some other node (not the filter node) incorporates them into a block. The resultant mempool may be smaller than the average mempool across the relevant distributed consensus network because some transactions are discarded, or the cumulative effect of the filter node selectively excluding transactions may lead to the cumulative mempool becoming much larger across the distributed consensus network.

Figure 3:
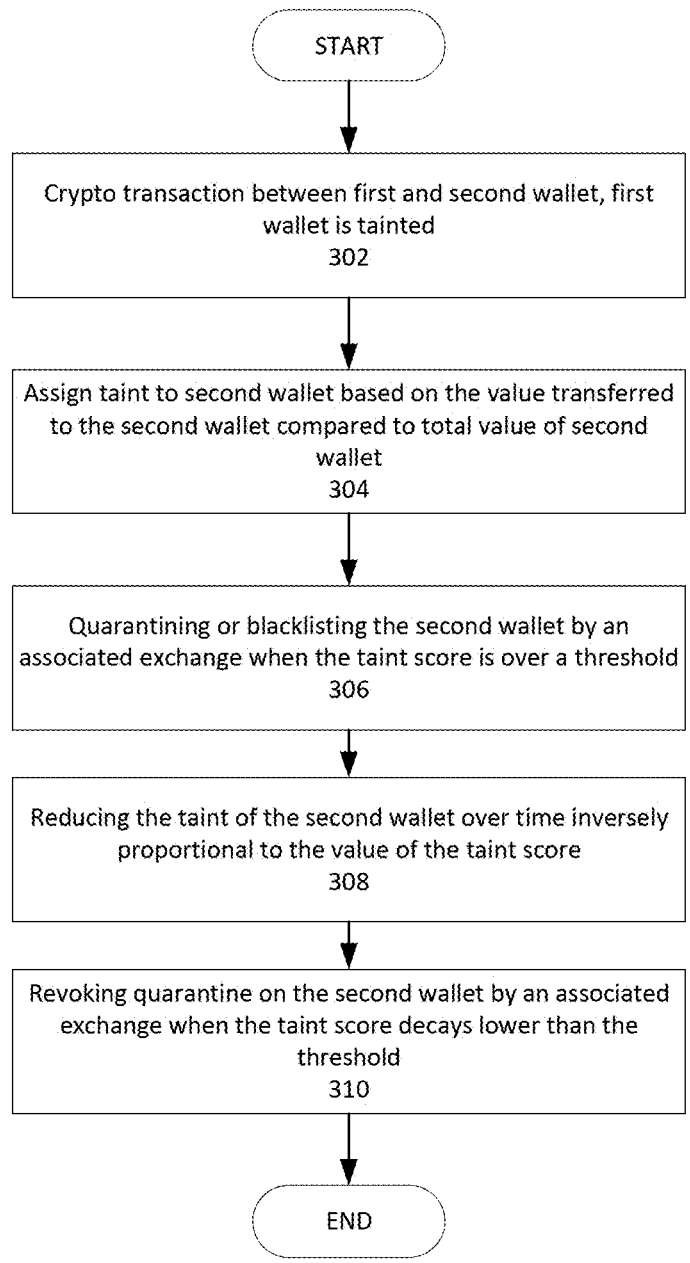
FIG. 3 is a flowchart illustrating assignment of AddressScores.

FIG. 3 illustrates identification of an AddressScore.

AddressScore Philosophy

In some embodiments, an AddressScore is binary. In these embodiments, the AddressScore is either 0 for safe or 1 for unsafe. The labelling for the AddressScore is sourced from government new releases and web sites, publicly available cryptographic object blockchain explorer websites, and Mechanical Turks. A fourth source is tracing from other unsafe cryptographic identifiers (e.g., intrinsic to extrinsic). Where a given address shifts a threshold percentage (of total held by that address) or a threshold number of cryptographic objects to a second address, the second address is automatically updated to a "1" and designated unsafe. In some embodiments, sample thresholds may be 50%, 75% or 100%. Events or transactions including cryptographic identifiers that are unsafe (1) are excluded from processing by the filter node.

In some embodiments, the AddressScore operates on a spectrum (from 0 to 1 rather than a binary value). There are several nuances to defining an AddressScore. In particular, an AddressScore should satisfy these constraints:

A) Permit the intrinsic AddressScore of a given wallet to affect the AddressScore of another wallet—having no intrinsic AddressScore—to which the other wallet is connected by multiple hops.

B) Arrange so that the intrinsic AddressScore of a given wallet does not diminish over time and hops yet diminishes immediately upon seizure by law enforcement.

C) Accommodate varying views of what constitutes criminal versus suspicious activity, as in the case of gambling.

D) Accommodate varying degrees of evidence of criminal activity, from direct to circumstantial to hearsay. Evidence comes from numerous channels include direct reports from the entity themselves. Each channel is given a confidence score. Self-reporting or reports by law enforcement are treated as trusted sources.

E) Arrange so that a wallet's AddressScore is proportional to criminal intent, as in the case of a scam victim who unwittingly sends funds to a scammer, or someone who receives an iota of heist proceeds through an airdrop—neither of which should suffer an increase in AddressScore.

F) Arrange so that a wallet's AddressScore reflects the proportion of funds exchanged with wallets carrying some amount of intrinsic risk, perhaps as well as the volume thereof.

Spectrum AddressScore

The AddressScore of a wallet (without intrinsic risk) as the proportion of funds that wallet has received from or sent to, possibly indirectly, nearby wallets with intrinsic risk. The AddressScore comprises values from 0 to 1, with 0 denoting "negligible risk" (since evidently none of the given wallet's in/outflow is traceable to a wallet with known criminal association) and 1 denoting "high risk" (since evidently all of the given wallet's in/outflow is traceable to wallets with known criminal association).

It is incorrect to conclude that the funds passed to or from a specified wallet are directly related to criminal activity. That said, receiving funds from a criminally-associated wallet is a form of money laundering, and sending funds to such a wallet is a form of funding crime—even if inadvertent or unwitting.

The system computes the influence of every wallet on every other wallet by looking at the proportional provenance and destination of funds flowing through each wallet. Influence of each wallet on each other is similar to the function of page-rank for search engines on the Internet, but for the propagation of cryptographic objects. The system can then use vectorized "influences" for any number of things, including but not limited to the propagation of criminality, flow of taint, or influence of a particular actor on the network.

In some embodiments, taint is passed on the basis of how tainted a given wallet is and how much of the content of the wallet is transacted. When taint is said to be "passed" the original wallet does not lose taint. Taint is conserved. A limited set of actions, or non-actions reduce taint. For example, reported seizure by law enforcement may remove taint from a wallet. Taint may be removed over time. The rate upon which taint is lost may be proportional to the current level of taint. For example, a wallet that is 1% tainted may lose that taint over a period of time (perhaps a year), while a wallet that is 100% tainted may require well over the lifespan of the average human to become untainted.

In step 302, a cryptographic event occurs between two cryptographic identifiers. The first of these identifiers is tainted. In step 304, the system assigns to the second identifier taint (e.g., that influences AddressScore) compared to the total value of the second identifier. The more tainted cryptographic objects are shifted to the second identifier, the more tainted the second identifier becomes.

In step 306, based on the new AddressScore of the second identifier, the system either an exchange or a filter node quarantines or blacklists the second identifier. A quarantined identifier cannot transact further with the exchange, and a blacklisted identifier will not have events included into blocks by a filter node.

In step 308, the taint of the second identifier is reduced overtime inversely proportional to the value of the AddressScore. That is, an AddressScore of 1 will not reduce at an appreciable rate (except in cases where law enforcement confiscates), but an AddressScore of 0.1 may reduce to 0 in cases where no further tainted actions occur.

In step 310, the quarantine or blacklist may be reversed once the second identifier decays below a given threshold.

Examples

1) A given wallet directly received the proceeds of a heist. The direct knowledge of its criminality automatically gives it an intrinsic AddressScore of 1, obviating the need to inspect its transactional neighborhood.

2) 100% of a given wallet's incoming funds are traceable to a wallet that directly received proceeds of a heist. The given wallet is given an extrinsic AddressScore of 1, derived from its relationship with the heist.

3) A reputable exchange harbors a deposit address that has directly received all the proceeds of a heist. If the exchange immediately quarantines that wallet so that there is no topological connection between the deposit address and its own wallet, the exchange's own extrinsic AddressScore will not be elevated. But if the exchange absorbs the heist proceeds and treats the value no differently from any other incoming value, the exchange is now complicit in money laundering, and the exchange wallet's extrinsic AddressScore will be related to the fraction of all funds ever coming into the exchange that came from the heist.

4) Where 1% of the income of a wallet comes from a 100% tainted wallet. The receiving wallet becomes 1% tainted.

5) Where 50% of the cryptographic object content of a 70% tainted wallet transacts, 35% taint is passed (70% of 50% is 35%).

6) Where 5% of the value ever sent from a given private wallet was paid to a dark market in a well-documented transaction that conveys criminal intent. That wallet is given an extrinsic AddressScore of 0.05, the proportion of its total funds sent that were intended for criminal activity.

7) In some embodiments, where 5% of the value ever to leave a given private wallet was paid to a ransom address. The paying wallet's extrinsic AddressScore is arguably 0, since the system is reluctant to hold victims accountable. (Other embodiments might assign some taint to the wallet, because it facilitated the crime.).

Implementation

Curation:

(1) Manually curate a set of address-entity associations—a record of addresses known to belong to particular entities.

(2) Manually map each entity to a category, resulting in a set of address-category associations.

(3) Assign each category an optional AddressScore, resulting in particular addresses being endowed with some level of intrinsic risk.

Curation is performed via data gathering. The system gathers address-entity associations through a variety of methods including: Manually perform transactions with known entities (e.g., exchanges, gambling sites, and mixers); purchase data sets from, and entering data-sharing agreements with, trusted parties; crawl sources of structured and unstructured labeled data; engage in sleuthing on the dark web (e.g., via Tor); transcribe published reports from news media and social media; ingest data shared by Blockseer users.

Each method and source are assigned a confidence level, so that the system can resolve conflicts (such as when an address is given conflicting labels). From raw sources, we derive a canonical set of several hundred entities, corrected for misspellings, alternate spellings, and historical changes of hands. Then, each of those entities is assigned a category, chosen from a canonical set of roughly thirty categories. Each category is assigned a (configurable) AddressScore between 0 and 1—or none at all.

Classification: Cluster addresses into wallets and extend the curated address-entity/category/risk associations to those wallets. Some cryptographic identifiers act together or operate using the same controller. In these cases, the cryptographic identifiers should be similarly grouped together for purposes of assigning AddressScores.

The Classification project has two ultimate outputs. First, a partition of the full set of addresses into wallets. Second, a mapping from a subset of those wallets to entities/categories/risk levels. Semi-supervised Address Classification groups addresses together based on compelling topological heuristics, and then classifies these groups by extending each address-entity/category/risk association to the other addresses in its group.

In some embodiments, the semi-supervised classification of addresses takes advantage of the "shared inputs" heuristic—grouping addresses that are inputs into the same transaction—and then applying the curated associations to these clusters.

In other embodiments, the heuristic includes an exception is the case of a heist, in which a stolen address gets cleaved from other addresses with which the stolen address has been a shared input into a transaction. Another exception comes from an early practice by some exchanges of permitting customers to upload their own addresses, rather than for the exchange to provide a deposit address. This resulted in the customers' addresses mingling with other addresses in the exchange, rendering the shared inputs heuristic irrelevant.

After forming groups of addresses using topological heuristics, the system extends each address-entity association to the rest of its group.

Supervised Transaction Classification transforms to transaction space—by assigning each transaction the class of that transaction's input addresses and uses supervised classification to map a larger set of transactions to entities, and then transform back to address space—by assigning each address the class(es) of the transactions emanating from it.

The supervised classification extends the classification to a larger set by analyzing patterns within and between transactions. Indeed, institutional entities (e.g., mixers and exchanges) generate distinctive transactions, and it's reasonable that "clumps" of transactions that look similar might belong to the same entity.

In particular, the system defines features that describe transactions and their topological neighborhoods (embedded in a sufficiently high-dimensional vector space), and then use any of the conventional classification algorithms to produce a mapping from transactions to entities or categories. Examples of intra-transactional features are:
  number and ratio of transaction inputs and outputs;
  transaction value scale and precision;
  change address likelihood;
  fee size and percentage; or input and output value distribution.

To identify inter-transactional topological features, the system follows random paths through the transaction graph, and then embeds these paths in a high-dimensional vector space. The intuition is that paths emanating from different transactions in the same class should land near one another. Assigning a transaction the same class as any of its input addresses puts us in a position us to employ any number of supervised classifications algorithms.

After classifying the full set of transactions, the system then transforms back to address space, applying a transaction class to its input addresses.

Finally, the quality of a mapping is measured by a suitable multi-class generalization of any of the usual classification metrics: accuracy, precision and recall, ROC AUC, F1 score, etc.

Risk Propagation: Devise a formula that proportionately propagates risk from wallets with quantified taint to all wallets. Given a directed graph of wallets in which each edge is labeled by the aggregate transaction value from one wallet to another and each node is labeled by its flow—the aggregate sum of its sent and received values over time, as well as its intrinsic AddressScore (possibly null).

A result of the "Classification" described above is the directed graph with nodes labeled by taint, and it is a routine calculation to add the other labels. Given this graph, taint is propagated according to two proportional flow matrices per wallet, calculated from the data above. The outflow matrix $F_O$ records the fraction of $W_A$'s flow that was sent to $W_B$. The inflow matrix $F_I$ records the fraction of $W_A$'s flow that came from $W_B$. Interpretation: in the case that $W_B$ is intrinsically risky, the first matrix approximates $W_A$'s culpability for funding B's criminal activity, and the second matrix approximates $W_A$'s culpability for laundering $W_B$'s dirty funds.

Naturally, risk can propagate beyond immediate neighbors, and to those neighbors' neighbors. Raising either proportional flow matrix to the nth power calculates the fraction of funds that went to (or came from) a given wallet's n-hop neighbors. Altogether, a wallet's risk is propagated to its 1-hop neighbors, its 2-hop neighbors, and so on.

Finally, this total flow matrix is multiplied by the vector of each node's intrinsic taint (replacing null values with 0), to yield all other nodes' extrinsic taint.

Figure 4:
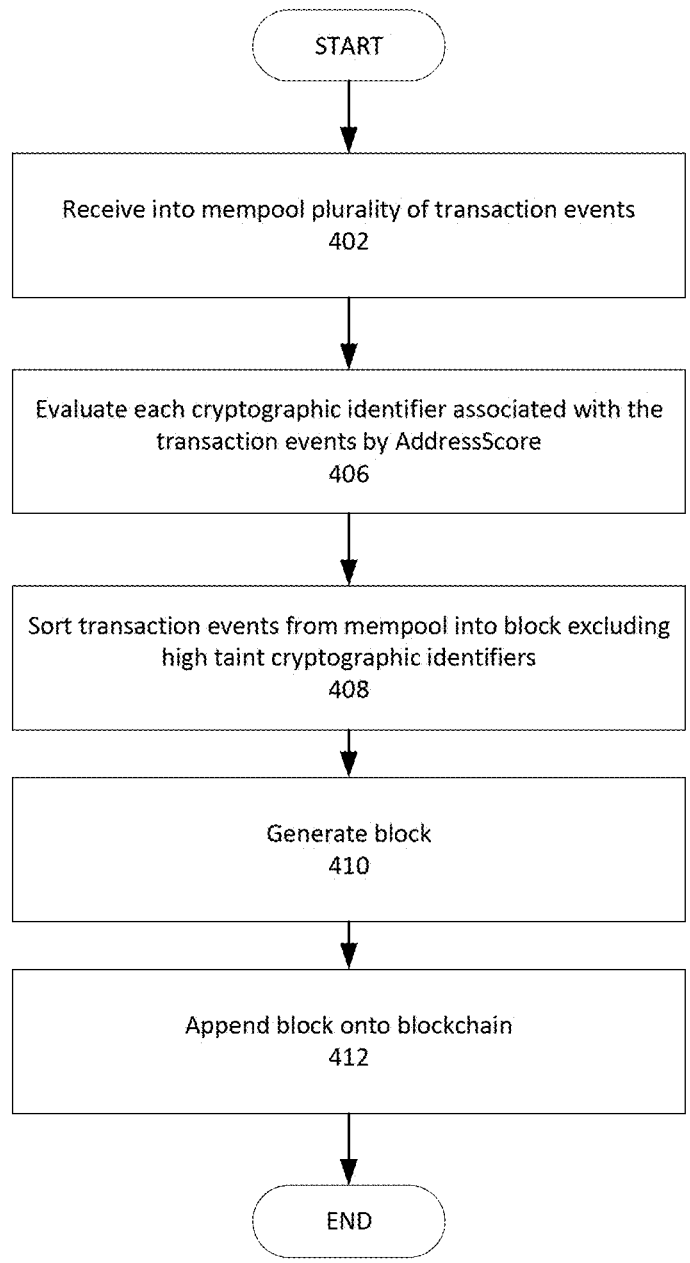
FIG. 4 is a flowchart illustrating exclusion of cryptographic identifiers from inclusion into blocks.

FIG. 4 is a flowchart illustrating exclusion of cryptographic identifiers from inclusion into blocks. In step 402, the mempool for the distributed consensus network receives a plurality of transaction events. The mempool is made up of a number of nodes. The mempool for each node may differ. A group of nodes may assemble together into a pool, that works together. The nodes of a pool are operated by ASIC hashing processors specifically designed to compute hash values efficiently. The nodes operating the method described herein are filter nodes.

Each of the transaction events include a cryptographic identifier associated with an input and/or and output of the transaction. Some transaction events include additional cryptographic identifiers. The cryptographic identifiers are often referred to as "public keys." The transaction events are collected together (based on memory size) and used to form blocks in a blockchain.

In step 404, the filter nodes that make up the pool of hashing processors evaluate each of the transaction events in the mempool based on each respective cryptographic identifier used by each of the transaction events. The cryptographic identifiers are evaluated based on AddressScore. In some embodiments, the evaluation is binary: 0 passes, and 1 fails. In other embodiments, the evaluation is threshold based relating to a score between 0 and 1.

In some embodiments, the evaluation is performed as a comparison to a list of cryptographic identifiers that meet the requirements for failure. The evaluation is performed on a constant basis as new transaction events are added to the mempool. The evaluation identifies those transaction events that fail and excludes them from the next step.

In some embodiments, the transaction events that fail are discarded from the mempool. Discarding the transactions alters the mempool with respect to a mempool that other nodes that are not part of the pool would otherwise see. Discarding transaction events reduces computation complexity in that the evaluation would not be performed on the same transaction event already in the mempool more than once. Simultaneously, the evaluation may be performed at receipt of a given transaction event to the mempool.

However, because of the difference in mempools across the distributed consensus network, other pools may continuously share previously discarded transaction events to the filter node mempool. In this circumstance, the transaction event would be repeatedly discarded on receipt. Where a significant fraction of the distributed consensus network operates filter nodes that discard failing transaction events, those transactions that fail may not propagate as well causing these transactions to be further suppressed. In these cases, it is possible those transactions that fail will not be shared to the mempool of nodes that would not have otherwise filtered out the transaction event.

In step 406, the filter nodes sorts through the plurality of events and identifies those to include into a block. Those transactions that failed at step 404 are expressly excluded from inclusion into the block. The exclusion may be because the transaction event is no longer in the filter node's mempool or because those transactions have been screened.

In step 408, the filter node generates the block using those transaction events that have been sorted for inclusion. In step 410, the newly generated block is appended to the blockchain.

Custom Mempool Protocol

Some embodiments disclosed herein involve introducing a transaction event (an "event") to a blockchain ledger without first broadcasting the event to all nodes on the greater blockchain network via transmission to a select set of nodes/miners/hashing processors. Targeting a given set of miners creates another way in which an originator of an event (a user) requests that events be added to a mempool that is stored on a node. The result of targeting a specific set of miners for dissemination of an event is that a given user achieves some intentionality or agency into which events appear in the same blocks on the blockchain as with their events. Some embodiments involve an application interfacing with a custom node executing a custom mempool protocol.

A customized node for the blockchain stores a mempool of a set of hashing processing executing a custom mempool protocol. The custom node receives events through an application program interface (API) developed for off-chain events. The custom node verifies an event based on the cryptographic hash included with the event. However, under the custom mempool protocol, the custom node will refrain from broadcasting or propagating any events that are received through the API to mempools of nodes that are not executing the custom mempool protocol. Thus, events that are submitted via the application to the custom node are known to the custom node alone, and not to the rest of the greater blockchain network until such events are appended in blocks to the blockchain. The mining pool network (pool of hashing processors) associated with the custom node receives events that are submitted through the API into a collective mempool of that subset of miners i.e., the list of events that are waiting to be mined. Thus, only miners that are part of the mining pool associated with the custom node confirm events submitted through the API.

Users submit events through a custom application. In some embodiments, the application is a custodial wallet that enables users to submit their events to a blockchain through a web user interface. Events are digitally signed by a cryptographic private key of the user (e.g., using a hardware private key device that connects through the web user interface, custodial private key database, direct input etc.) according to the public blockchain protocol. The user submitted events are then submitted through the API to the custom node that processes the event according to the custom mempool protocol.

Some embodiments enable the custom node to process events received from the greater blockchain network. The custom node communicates information to and from neighboring nodes, some of which may not be executing the custom mempool protocol. When the custom node receives events from other nodes that are not executing the custom mempool protocol, the custom node performs a filtering process on these events. In some embodiments, the custom node only allows events with parameters satisfying a screening criterion to be further processed by the custom node. In some cases, the screening criterion excludes events with cryptographic identifiers on a blacklist such as those associated with fraud, crime, or risk as described herein.

As a result, the miners of the custom node hash blocks using only events transmitted by the application or events with parameters satisfying the screening criterion. In some embodiments, the custom node only hashes blocks with events that come from a trusted source (e.g., the application) or have been filtered to exclude fraudulent or suspicious events. In some embodiments, other application users have passed a background check, indicating that their events transmitted through the application are likely not associated with suspicious or fraudulent activity. Thus, events transmitted through the application will not end up in the same block as other events that could associated the user with events of a nefarious nature.

When a block is submitted to the blockchain network, verification of off-chain events via the custom node still operate in a manner that is compatible with the public blockchain protocol. For example, the public address of a user's event is generated by hashing the event using the public key of the user. Blocks produced via the miners of the custom node are hashed in the same way as other blocks on the blockchain (e.g., the block are of the same maximum size, and reference the last hash of the previous block of an existing chain). Thus, while the custom node executes a custom mempool protocol for processing events, the custom node still adds events transmitted by the application to the blockchain consistent with the existing public blockchain protocol.

A public or unmodified blockchain protocol refers to a set of protocols and network requirements that are controlled by influential developer groups and "voted" on by miners at large. For example, anyone can make changes to Bitcoin's code—it's open source. Getting the changes implemented, however, requires network consensus, and that is extremely difficult to achieve. Imagine trying to get 20 people with different philosophies, political convictions, economic incentives and life goals to agree on a simple change. Now, multiply that by hundreds if not thousands, make the changes complicated, and the endeavor becomes exceedingly difficult. This protects the network from any change other than those the majority believe are beneficial to the entire ecosystem.

Some changes can be made to the protocol without the consent of the majority at large. These changes do not directly impact the way the resulting blocks appear to the greater network. These changes are thus inherently more restrictive. A reasonable analogy is application of the supremacy clause of the U.S. constitution as applies to federal and state law. Federal law sets minimum requirements, but states can set laws that are more restrictive. Where there is conflict, federal law controls. Similarly, a public blockchain protocol dictates how blocks are generated, but a custom protocol may add additional restrictions and remain compatible with the public blockchain protocol.

Thus, the custom node exerts greater control over the blocks it generates than is otherwise required by the public protocol without requiring a hard fork of the blockchain. The custom node is therefore operating a different (more restrictive) protocol than many other nodes operating on the same consensus network (e.g., Bitcoin, Bitcoin Cash, Ethereum, Ethereum Classic, Litecoin, Ripple, Dogecoin, etc.).

Some embodiments disclosed herein allow the user more say over which mining pool or subset of the mining pool is able to process and confirm their event. Instead of being processed by unknown nodes throughout the greater blockchain network, events transmitted through the application are processed by the custom node executing the custom mempool protocol before being added to the blockchain. There is more information available about the miners associated with the custom node. In some cases, the information includes the miners' location of operation.

In some embodiments, miners have been vetted through a screening process that removes any undesirable miners. Thus, by submitting their events through the application, users have their events processed by a limited set of hashing processors. The result of targeting a specific set of miners for dissemination of an event is that a given user achieves some intentionality or agency into which events appear in the same blocks on the blockchain as with their events and where their miners are located.

In some embodiments, users further choose which miners within those executing the custom mempool protocol process and confirm their event. For example, a user inputs parameters for an event to indicate a set of hashing processors that is to process the event. In some cases, the parameters include geographical location information indicating that the user wants their event to be processed only by miners located in a location (e.g., a country, a region, etc.) indicated by the geographic location information. The application then interfaces with the custom node to ensure that the event is processed only by miners located in that identified location, which allows the user to further limit the miners that process their event. In some embodiments, the geographical location information indicates multiple locations (e.g. multiple countries or regions). In these embodiments, the application interfaces with the custom node to ensure that the event is processed by miners located in only those multiple locations. The user thus achieves intentionality into which events appear in the same blocks on the blockchain on with their events.

Figure 5:
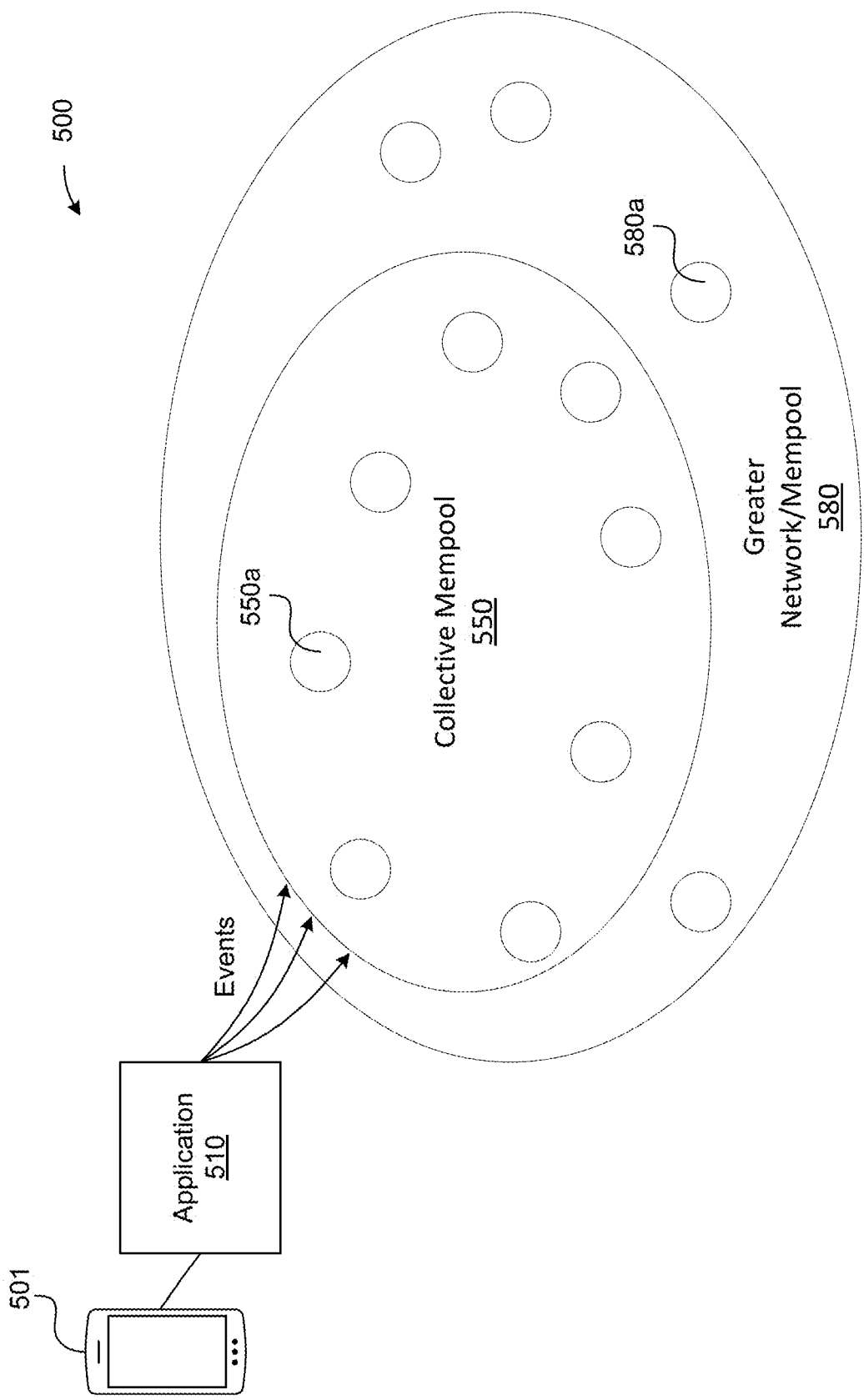
FIG. 5 is a diagrammatic representation of a system with a collective mempool for processing events transmitted by an application.

FIG. 5 is a diagrammatic representation of a system 500 with a collective mempool 550 for processing events transmitted by an application. System 500 includes a user device 501 running an application 510, that transmits events to collective mempool 550 which is part of a greater network/mempool 580. Collective mempool 550 is a mempool of a set of hashing processors 550a executing the custom mempool protocol. Greater network/mempool 580 is the mempool of hashing processors of the greater blockchain network (e.g., the Bitcoin or Ethereum network), including those executing the public blockchain protocol but not the custom mempool protocol. Hashing processors are associated with nodes that group together to form pools as described herein. Nodes associated with collective mempool 550 and are executing the custom mempool protocol are also known as filter nodes as described herein. Depicted in the figure, hashing processors 550a is part of a pool of hashing processors corresponding to collective mempool 550 and hashing processors 580a is part of a pool of hashing processors corresponding to the greater network/mempool 580. Each node has its own mempool and holds a full copy of the blockchain.

The depiction in FIG. 5 is for exemplary purposes only and is not intended to be limiting. For example, system 500 includes a plurality of user devices running application 510, each transmitting events or other information to collective mempool 550. Further, collective mempool 550 and greater network/mempool 580 includes a different number of nodes than depicted in FIG. 5. Characteristics described with respect to hashing processors 550a apply to other hashing processors associated with collective mempool 550 and that are executing the custom mempool protocol. Characteristics described herein with respect to hashing processors 580a apply to other hashing processors that are part of the greater network/mempool 580 and that are executing the public blockchain protocol.

User device 501 is a device operated by a user and that runs application 510. User device 501 communicates information to and from collective mempool 550 over a suitable network interface. Examples of user device 501 include a mobile phone, tablet device, personal computer, or the like.

Application 510 is software that enables processing of events by a custom node executing the custom mempool protocol. Application 510 runs on user device 501 and communicates information over an API developed for off-chain events. Application 510 receives user input from user device 501 and transmits events or other information to collective mempool 550. Application 510 receives parameters for events from a user and transmit such events to collective mempool 550. In some embodiments, application 510 selects a set of hashing processors based on the received parameters. In some cases, the received parameters include geographical location information, such that selecting the set of hashing processors involves identifying and limiting the set of hashing processors that process the event to the hashing processors executing the custom mempool protocol and physically located at a location consistent with the geographical location information. Prior to transmitting events to collective mempool 550, application 510 digitally signs the events by a cryptographic private key of user 501 according to the public blockchain protocol.

Collective mempool 550 is a mempool of a set of hashing processors executing the custom mempool protocol. Collective mempool 550 includes a collection of events awaiting verifications and confirmation by the set of hashing processors. The collection of events includes events transmitted by application 510 or events with parameters satisfying a screening criterion (e.g., events associated with cryptographic identifiers not on a blacklist or associated with criminal activity). The events with parameters satisfying a screening criterion originate from nodes of greater network/mempool 580, which then sends the events to hashing processors associated with collective mempool 550. While the greater network 580 propagates all events received (according to the public blockchain protocol), those events that do not satisfy the screening criterion are discarded and not propagated further.

In some embodiments, hashing processors 580a sends an event to hashing processors 550a (either directly or indirectly by transmissions through neighboring nodes), which determines whether parameters of the event satisfy a screening criterion. Hashing processors of the custom node only process/hash events to append to the public blockchain when the parameters of the event satisfy the screening criterion. Thus, collective mempool 550 only includes events that come from intentional sources, such as application 510, or events that were not filtered out based on screening criterion.

The set of hashing processors associated with collective mempool 550 executes a custom mempool protocol that is independent of the public blockchain protocol. The custom mempool protocol differs from the public blockchain protocol. For example, the set of hashing processors executing the custom mempool protocol hashes event transmitted by application 510 only into blocks with other events transmitted by application 510 or events with parameters satisfying a screening criterion. Further, the set of hashing processors executing the custom mempool protocol will not propagate events transmitted by application 510 to mempools of nodes that are not executing the custom mempool protocol. Thus, hashing processors 550a are selective about which events are hashed together into blocks for the blockchain, while hashing processors 580a would not receive events transmitted by application 510. In contrast, hashing processors executing the public blockchain protocol would typically hash events into blocks with any other events and also attempt to propagate events to mempools of all other nodes in the blockchain network. Thus, a user transmitting events from application 510 exercises choice over which custom set of hashing processors executing the custom mempool protocol process the user's events.

Embodiments described herein provide multiple benefits. One benefit is that a given user achieves intentionality or agency into which events appear in the same blocks on the blockchain on with their events. Since blocks hashed by hashing processors executing the custom mempool protocol will contain only events transmitted by a trusted source, such as application 510, or events with parameters satisfying a screening criterion, users ensure that their events are less likely to be associated with other undesirable events. Another benefit is that events processed under the custom mempool protocol are still compatible with the blockchain under the public blockchain protocol. For example, events processed under the custom mempool protocol are hashed into blocks, which are then be broadcast for appending to the blockchain data structure according to the public blockchain protocol. Thus, no changes have to be made to the existing public blockchain protocol.

Greater network/mempool 580 is the mempool of hashing processors of the greater blockchain network. The greater blockchain network includes hashing processors that execute the public blockchain protocol, like those of hashing processors 580*a*, as well as hashing processors that execute the custom mempool protocol, like those of hashing processors 550*a*. While not explicitly shown in FIG. 5, it is understood that there is a suitable network interface that enables nodes to communicate information to each other. In some embodiments, information is transmitted to nodes throughout the blockchain network by propagation of information to neighboring nodes, which then further propagate information to further neighboring nodes and so on until the information has reached all nodes meant to receive the information. As described above, nodes with hashing processors executing the custom mempool protocol choose to refrain from propagating information to mempools of nodes not executing the custom mempool protocol.

Figure 6:
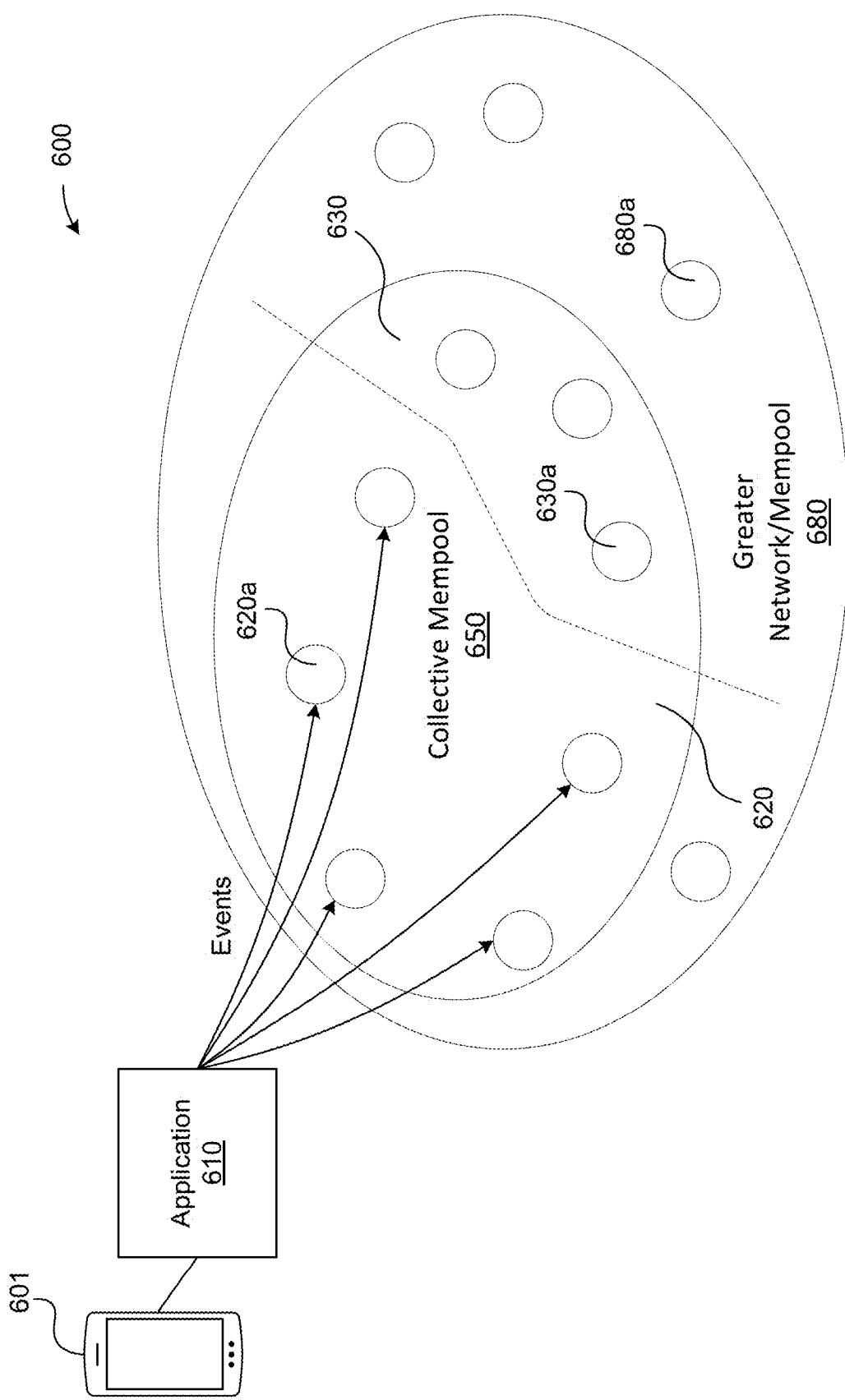
FIG. 6 is a diagrammatic representation of a system with a collective mempool from which a subset of hashing processors process events transmitted by an application.

FIG. 6 is a diagrammatic representation of a system 600 with a collective mempool from which a subset of hashing processors process events transmitted by an application. System 600 includes a user device 601 running an application 610, which transmits events to collective mempool 650 that is part of a greater network/mempool 680. Collective mempool 650 is a mempool of a set of hashing processors that executes a custom mempool protocol. Greater network/mempool 680 is the mempool of hashing processors of the greater blockchain network, including those that execute the public blockchain protocol. In some embodiments, user device 601, application 610, collective mempool 650, and greater network/mempool 580 include similar characteristics to those described with respect to user device 501, application 510, collective mempool 550, and greater network/mempool of FIG. 5. Additional characteristics of system 600 are described below.

In some embodiments, collective mempool 650 is further split into subgroups delineated by criteria controlled by a mempool mining pool administrator (e.g., geographic location, hardware/software versions, legal policy compliance, etc.). Fur purposes of illustration, the mempool subgroups are portrayed via collective mempool 620 and collective mempool 630. The divide between hashing processors associated with collective mempool 620 and hashing processors associated with collective mempool 630 is depicted by a dotted line running through collective mempool 650. Collective mempool 620 is a mempool of a first subset of hashing processors executing the custom mempool protocol and collective mempool 630 is a mempool of a second subset of hashing processors executing the custom mempool protocol. While FIG. 6 depicts only two subsets of hashing processors of collective mempool 650, more subsets can exist.

Hashing processors 620*a* are part of a pool of hashing processors corresponding to collective mempool 620, hashing processors 630*a* are part of a pool of hashing processors corresponding to collective mempool 630, and hashing processors 680*a* is part of a pool of hashing processors corresponding to the greater network/mempool 680. Characteristics described herein with respect to hashing processors 620*a* apply to other hashing processors associated with collective mempool 620, characteristics described with respect to hashing processors 630*a* apply to other hashing processors associated with collective mempool 630, and characteristics described with respect to hashing processors 680*a* apply to other hashing processors that are part of the greater network/mempool 680.

In a given example, only hashing processors associated with collective mempool 620 receive an event transmitted by application 610. A user inputs parameters for an event into application 610 to indicate their choice as to what kind of hashing processors they would like to process their event. In some embodiments, the received parameters include geographical location information (e.g., information indicating a country). Application 610 determines that only the subset of hashing processors associated with collective mempool 620 (including hashing processors 620*a*) are located in the location indicated by the provided geographical location information. Application 610 then only enables the subset of hashing processors associated with collective mempool 620 to receive and process the event. Thus, hashing processors 620*a* process the user's event, while hashing processors 630*a* do not. The user achieves intentionality as to which hashing processors process their events by further narrowing their selection of hashing processors out of the set of hashing processors executing the custom mempool protocol.

The depiction in FIG. 6 is for illustrative purposes only and is not limiting. For example, system 600 includes a plurality of user devices running application 610, each transmitting events or other information to collective mempool 650, collective mempool 620, or collective mempool 630. Further, collective mempool 650, collective mempool 620, collective mempool 630, and greater network/mempool 680 includes a different number of nodes than depicted in FIG. 6.

Figure 7:
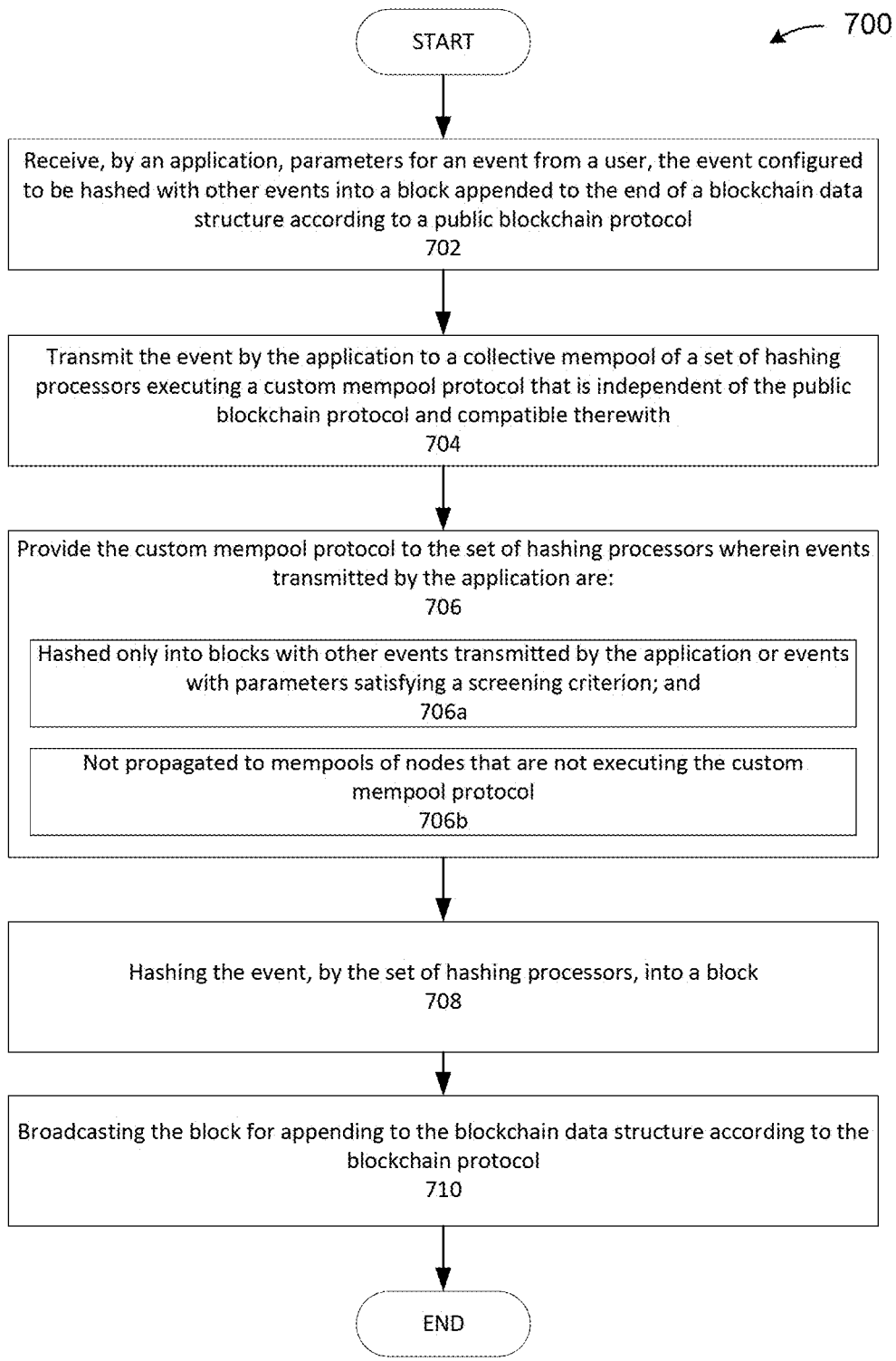
FIG. 7 is a flowchart illustrating operation of a pool of proof of work hashing processors and a custom mempool.

FIG. 7 is a flowchart 700 illustrating operation of a pool of proof of work hashing processors and a custom mempool. The steps described in flowchart 700 are carried out by systems such as system 500 of FIG. 5 or system 600 of FIG. 6, which include an application interfacing with hashing processors operating a custom mempool protocol. Some steps of flowchart 700 are described below with respect to components of FIG. 5 and FIG. 6.

At step 702, the application receives parameters for an event from a user. The event is configured to be hashed with other events into a block that is appended to the end of a blockchain data structure according to a public blockchain protocol. The user inputs the parameters using the application's user interface displayed on the user's user device. For example, a user inputs parameters for an event into application 510 running on user device 501. The parameters include any pieces of information that indicate how the user prefers the event to be processed. The information indicates characteristics of hashing processors (e.g., geographical location information, processing power, etc.) that the user wants to be used to process their event.

At step 704, the application transmits the event to a collective mempool of a set of hashing processors executing a custom mempool protocol that is independent of the public blockchain protocol. For example, application 510 transmits an event to collective mempool 550. Collective mempool 550 is a mempool of a set of hashing processors, including hashing processors 550*a*, executing the custom mempool protocol. While hashing processors executing the custom mempool protocol process events differently from hashing processors executing the public blockchain protocol, blocks that are hashed under the custom mempool protocol are still compatible with the public blockchain protocol and are appended to the blockchain. In some embodiments, events transmitted by the application are digitally signed by a cryptographic private key of the user according to the public blockchain protocol.

At step 706, the system provides the custom mempool protocol to the set of hashing processors associated with the collective mempool. For example, system 500 provides the custom mempool protocol to the hashing processors associated with collective mempool 550, including hashing processors 550a. Providing the custom mempool protocol involves transmitting information to the receiving hashing processors that is used to properly execute the custom mempool protocol (e.g., instructions for executing the custom mempool protocol).

Events transmitted by the application to the collective mempool are processed according to the custom mempool protocol. Each event transmitted by the application is hashed only into blocks with other events transmitted by the application or events with parameters satisfying a screening criterion (step 706a). Further, each event transmitted by the application is not propagated to mempools of nodes that are not executing the custom mempool protocol (step 706b).

In an exemplary implementation of step 706a, events transmitted by application 510 to collective mempool 550 are hashed only into blocks with other events transmitted by application 510 or events received from greater network/mempool 580 but filtered based on screening criterion. In some embodiments, other application users have passed a background check, so that events transmitted through the application originate from only known users. Further, hashing processors associated with collective mempool 550 each filter events that are not received from application 510 i.e., events that are received from hashing processors of greater network/mempool 580. The filtering is conducted based on parameters associated with the events received from greater network/mempool 580. Thus, by transmitting their events by application 510, users achieve choice over what kinds of other events are hashed together in a block with the user's event.

In an exemplary implementation of step 706b, events transmitted by application 510 to collective mempool 550 are not propagated to mempools of nodes that are not executing the custom mempool protocol. While mempools of nodes in a public blockchain network typically attempt to propagate events to mempools of all other nodes in the network, nodes associated with collective mempool 550 choose to refrain from propagating events transmitted by application 510 to mempools of other nodes not executing the custom mempool protocol. Thus, hashing processors from greater network/mempool 580 executing the public blockchain protocol (e.g., hashing processors 580a) would not receive events transmitted by application 510 because hashing processors associated with collective mempool 550 (e.g., hashing processors 550a) choose not to propagate such events outside of collective mempool 550.

On the contrary, hashing processors executing the custom mempool protocol propagate events that were not received through the application to mempools of nodes that are not executing the custom mempool protocol. For example, hashing processors associated with collective mempool 550 propagate events received from hashing processors executing the public blockchain protocol (e.g., hashing processors 580a) to mempools of nodes outside of collective mempool 550. Thus, the custom mempool protocol allows events that are not transmitted by the application to be propagated to the greater blockchain network in accordance with the public blockchain protocol.

Some benefits of executing steps 706a and 706b include providing users more control over how their events are processed before getting added into the blockchain. Due to step 706a, events transmitted by the application are only hashed into blocks that contain only events from a trusted source (e.g., the application) or that have been filtered based on screening criteria. Thus, events transmitted by the application are only added to the blockchain as part of "clean" blocks that only contain valid events from intentional sources. Further, due to step 706b, users prevent hashing processors outside of collective mempool 550 from processing their events transmitted by the application. By using the application, users ensure that their events are processed by a set of intentional hashing processors, rather than by other hashing processors in the public blockchain network about which the user has little or no information. The result of targeting a specific set of hashing processors for dissemination of an event is that a given user achieves some intentionality or agency into which events appear in the same blocks on the blockchain on with their events.

In some embodiments, events transmitted by the application are prioritized over other events not transmitted by the application. For example, the set of hashing processors executing the custom mempool protocol selects events transmitted by the application to be hashed into blocks before selecting other events that are not transmitted by the application. Events transmitted by the application are then added into blocks more quickly instead of remaining in mempools unprocessed.

At step 708, the set of hashing processors executing the custom mempool protocol hashes the event transmitted by the application into a block. For example, hashing processors associated with collective mempool 550 hash the event transmitted by application 510 into a block. While the block contains only events transmitted by the application or events with parameters satisfying a screening criterion, the block is hashed in the same way as other blocks on the blockchain data structure according to the public blockchain protocol.

At step 710, the block is broadcast for appending to the blockchain data structure according to the public blockchain protocol. The block is submitted to the public blockchain network, which verifies the block in accordance with the public blockchain protocol. Thus, no changes are made to the existing public blockchain protocol in order to add blocks including events processed under the custom mempool protocol.

In some embodiments, the set of hashing processors that process events transmitted by the application is further limited beyond the set of all hashing processors executing the custom mempool protocol. In some cases, prior to transmitting the event by the application to the collective mempool, the application selects the set of hashing processors based on the parameters received for the event. In an exemplary case, the parameters received for the event includes geographical location information. Selecting the set of hashing processors then involves identifying the set of hashing processors executing the custom mempool protocol and physically located at a location consistent with the geographical location information, and then limiting the set of hashing processors that process the events to those identified.

An example of how the set of hashing processors that process events transmitted by the application is further limited is described with respect to system 600 of FIG. 6. User 601 inputs geographical location information indicating a country for an event into application 610, indicating that they want the event to be processed only by hashing processors located in that country. Application 610 then selects the set of hashing processors executing the custom mempool protocol that are in the specified country. In an exemplary case, the application identifies hashing processors associated with collective mempool 620 (including hashing processors 620a) as executing the custom mempool protocol and located in the specified country. The application then limits the hashing processors to which the application transmits the event of user 601 to the hashing processors associated with collective mempool 620. Thus, hashing processors associated with collective mempool 630 (including hashing processors 630a) do not receive the event, even though they are executing the custom mempool protocol.

While flowchart 700 focuses on processing of one event transmitted by the application, it is understood that the system can process multiple transactions. In some embodiments, in addition to the first event of the first user described above, the application further receives parameters for a second event from a second user. Similar to the first event, the second event is configured to be hashed with other events into the block appended to the end of the blockchain data structure according to the public blockchain protocol. The application further transmits the second event to the collective mempool of the set of hashing processors executing the custom mempool protocol that is independent of the public blockchain protocol. The first event and the second event are present in the collective mempool at the same time. As a result, the set of hashing processors associated with the collective mempool hash the second event into the same block into which the first event of the first user was also hashed.

In some cases, when the system processes multiple events, the application selects different sets of hashing processors to process different events. For example, in addition to the first set of parameters of a first event received from the first user, the application further receives a second set of parameters for a second event from a second user. The second set of parameters is different from the first set of parameters. Similar to the first event, the second event is configured to be hashed with other events into the block appended to the end of the blockchain data structure according to the public blockchain protocol.

In some embodiments, the set of hashing processors used to process the first event is a first subset of hashing processors executing the custom mempool protocol. The application then further identifies, based on the second set of parameters for the second event, a second subset of hashing processors executing the custom mempool protocol that is independent of the public blockchain protocol. In some cases, the second subset of hashing processors is different from the first subset of hashing processors. The application transmits the second event to the second subset of hashing processors executing the custom mempool protocol, which then hashes the second event into the second block. Finally, the second block is broadcast for appending to the blockchain data structure according to the public blockchain protocol.

An example of how the application selects different subsets of hashing processors to process different events is described with respect to system 600 of FIG. 6. User 601 inputs into application 610 parameters including geographical location information indicating a first country, for example the United States, for a first event. Upon identifying that the hashing processors associated with collective mempool 620 are in the United States, application 610 then selects those hashing processors associated with collective mempool 620 to process the first event. Further, a second user other than user 601 inputs into application 610 different parameters including geographical location information indicating a second country, for example Canada, for a second event. Upon identifying that the hashing processors associated with collective mempool 630 are in Canada, application 610 then selects those hashing processors associated with collective mempool 630 to process the second event. Application 610 then sends the first event to the hashing processors associated with collective mempool 620 and sends the second event to the hashing processors associated with collective mempool 630. Accordingly, the first and second events are processed by different subsets of hashing processors that execute the custom mempool protocol. Thus, both the first user and the second user exercise intentionality and agency over which hashing processors process their respective events.

Figure 8:
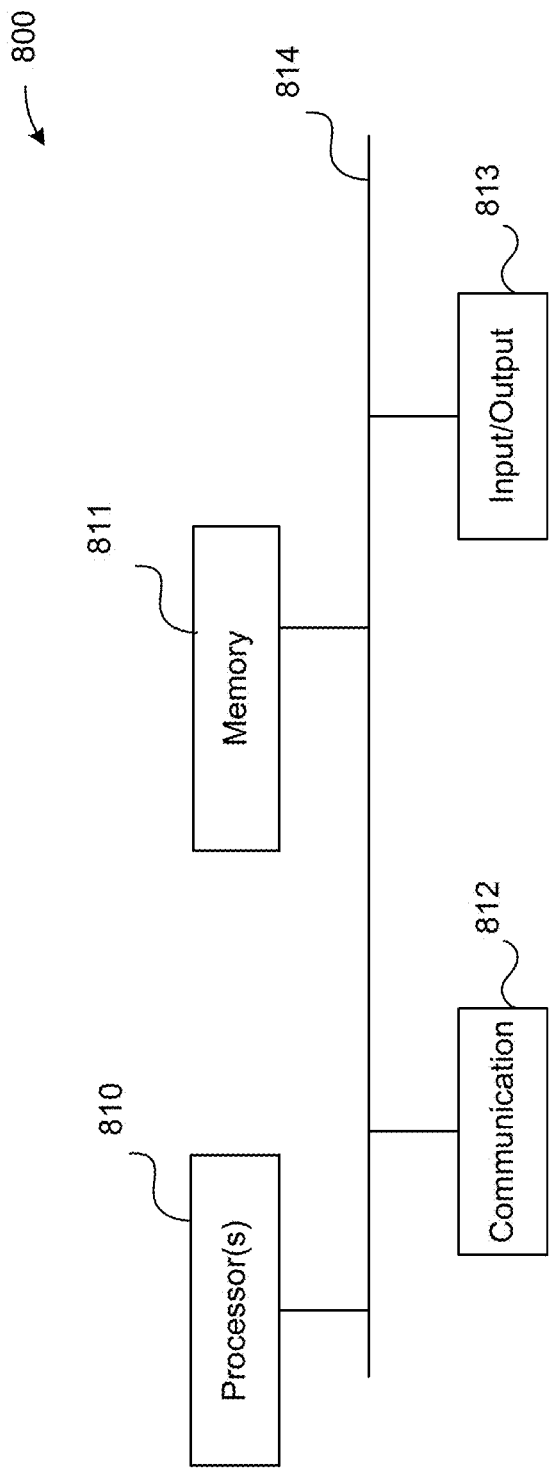
FIG. 8 is a block diagram of an exemplary computing system.

FIG. 8 is a high-level block diagram showing an example of a processing device 800 that can represent a system to run any of the methods/algorithms described above. A processing device used to "mine" cryptographic objects is often evaluated based on a hash rate and an electrical power efficiency. A system may include two or more processing devices such as represented in FIG. 8, which may be coupled to each other via a network or multiple networks. A network can be referred to as a communication network.

In the illustrated embodiment, the processing device 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, scanners, adapters and/or other conventional connection devices. Each processor 810 may be or include, for example, one or more general-purpose programmable microprocessors or microprocessor cores, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 800 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of operating a pool of proof of work hashing processors ("hashing processors") and a custom mempool comprising:
   receiving, by an application, parameters for an event from a user, the event configured to be hashed with other events into a block appended to the end of a blockchain data structure according to a public blockchain protocol, the parameters including geographical location information;
   identifying the set of hashing processors executing the custom mempool protocol and physically located at a location consistent with the geographical location information; and
   limiting the set of hashing processors to those executing the custom mempool protocol and physically located at the location consistent with the geographical location information;
   transmitting the event by the application to a collective mempool of a set of hashing processors executing a custom mempool protocol that is independent of the public blockchain protocol and compatible therewith;
   providing the custom mempool protocol to the set of hashing processors wherein events transmitted by the application are:
      hashed only into blocks with other events transmitted by the application or events with parameters satisfying a screening criterion; and
      not propagated to mempools of nodes that are not executing the custom mempool protocol;
   hashing the event, by the set of hashing processors, into a block; and
   broadcasting the block for appending to the blockchain data structure according to the public blockchain protocol.

2. The method of claim 1, wherein the events transmitted by the application are further prioritized such that the events transmitted by the application are selected to be hashed into blocks before other events not transmitted by the application are selected.

3. The method of claim 1, wherein the set of hashing processors executing the custom mempool protocol propagates events that were not received through the application to mempools of nodes that are not executing the custom mempool protocol.

4. The method of claim 1, wherein the events transmitted by the application are digitally signed by a cryptographic private key of the user according to the public blockchain protocol.

5. The method of claim 1, wherein the user is a first user and the event is a first event, the method further comprising:
   receiving, by the application, parameters for a second event from a second user, the second event configured to be hashed with other events into the block appended to the end of the blockchain data structure according to the public blockchain protocol;
   transmitting the second event by the application to the collective mempool of the set of hashing processors executing the custom mempool protocol that is independent of the public blockchain protocol and compatible therewith, wherein the first event and the second event are present in the collective mempool at the same time; and
   hashing the second event, by the set of hashing processors, into the block.

6. The method of claim 1, wherein the block is a first block, the user is a first user, the event is a first event, the parameters are a first set of parameters, and the set of hashing processors is a first subset of hashing processors executing the custom mempool protocol, the method further comprising:
   receiving, by the application, a second set of parameters for a second event from a second user, the second set of parameters different from the first set of parameters, the second event configured to be hashed with other events into a second block appended to the end of the blockchain data structure according to the public blockchain protocol;

identifying, based on the second set of parameters for the second event, a second subset of hashing processors executing the custom mempool protocol that is independent of the public blockchain protocol and compatible therewith, wherein the second subset of hashing processors is different from the first subset of hashing processors;

transmitting, by the application, the second event to the second subset of hashing processors executing the custom mempool protocol;

hashing the second event, by the second subset of hashing processors executing the custom mempool protocol, into the second block; and broadcasting the second block for appending to the blockchain data structure according to the public blockchain protocol.

7. A system comprising:

a set of hashing processors configured to receive, via a network interface, a custom mempool protocol;

an application configured to receive, via the network interface, parameters for an event from a user, wherein the event is configured to be hashed with other events into a block appended to the end of a blockchain data structure according to a public blockchain protocol, the application further configured to transmit, via the network interface, the event to a collective mempool of the set of hashing processors executing a custom mempool protocol that is independent of the public blockchain protocol and compatible therewith;

a custom mempool associated with the set of hashing processors, the custom mempool executing the custom mempool protocol and storing the event; and a memory including instructions that when executed cause the custom mempool protocol to be provided to the set of hashing processors, wherein events transmitted by the application are hashed only into blocks with other events transmitted by the application or events with parameters satisfying a screening criterion and not propagated to mempools of nodes that are not executing the custom mempool protocol, and wherein the memory includes further instructions that when executed cause the set of hashing processors to hash the event into a block and broadcast the block for appending to the blockchain data structure according to the public blockchain protocol, wherein the parameters received for the event include geographical location information, and wherein the memory includes further instructions that when executed cause the application to select the set of hashing processors by identifying and limiting the set of hashing processors to those executing the custom mempool protocol and physically located at a location consistent with the geographical location information.

8. The system of claim 7, wherein the memory is subdivided into a first subdivision of memory and a second subdivision of memory, and further wherein the first subdivision of memory is configured to execute instructions that cause the set of hashing processors to process events transmitted by the application and the second subdivision of memory is configured to execute instructions that cause the set of hashing processors to process events that are not transmitted by the application.

9. The system of claim 7, wherein the memory includes further instructions that when executed cause the set of hashing processor to prioritize the events transmitted by the application such that said events transmitted by the application are selected to be hashed into blocks before other events not transmitted by the application are selected.

10. The system of claim 7, wherein the user is a first user and the event is a first event, and wherein the memory includes further instructions that when executed cause the application to receive parameters for a second event from a second user, the second event configured to be hashed with other events into the block appended to the end of the blockchain data structure according to the public blockchain protocol, and transmit the second event by the application to the collective mempool of the set of hashing processors executing the custom mempool protocol that is independent of the public blockchain protocol and compatible therewith, wherein the first event and the second event are present in the collective mempool at the same time, and wherein the memory includes further instructions that when executed cause the set of hashing processors to hash the second event into the block.

11. A non-transitory computer-readable storage medium storing instructions that, when executed by a computing system, cause the computing system to perform a process comprising:

receiving, by an application, parameters for an event from a user, the event configured to be hashed with other events into a block appended to the end of a blockchain data structure according to a public blockchain protocol, the parameters including geographical location information;

identifying the set of hashing processors executing the custom mempool protocol and physically located at a location consistent with the geographical location information; and limiting the set of hashing processors to those executing the custom mempool protocol and physically located at the location consistent with the geographical location information;

transmitting the event by the application to a collective mempool of a set of hashing processors executing a custom mempool protocol that is independent of the public blockchain protocol and compatible therewith;

providing the custom mempool protocol to the set of hashing processors wherein events transmitted by the application are:
  hashed only into blocks with other events transmitted by the application or events with parameters satisfying a screening criterion; and
  not propagated to mempools of nodes that are not executing the custom mempool protocol;

hashing the event, by the set of hashing processors, into a block; and broadcasting the block for appending to the blockchain data structure according to the public blockchain protocol.

12. The computer-readable storage medium of claim 11, wherein the events transmitted by the application are further:
  prioritized such that the events transmitted by the application are selected to be hashed into blocks before other events not transmitted by the application are selected.

13. The computer-readable storage medium of claim 11, wherein the user is a first user and the event is a first event, the process further comprising:
  receiving, by the application, parameters for a second event from a second user, the second event configured to be hashed with other events into the block appended to the end of the blockchain data structure according to the public blockchain protocol;

transmitting the second event by the application to the collective mempool of the set of hashing processors executing the custom mempool protocol that is independent of the public blockchain protocol and compatible therewith, wherein the first event and the second event are present in the collective mempool at the same time; and hashing the second event, by the set of hashing processors, into the block.

14. The computer-readable storage medium of claim 11, wherein the block is a first block, the user is a first user, the event is a first event, the parameters are a first set of parameters, and the set of hashing processors is a first subset of hashing processors executing the custom mempool protocol, the process further comprising:

receiving, by the application, a second set of parameters for a second event from a second user, the second set of parameters different from the first set of parameters, the second event configured to be hashed with other events into a second block appended to the end of the blockchain data structure according to the public blockchain protocol;

identifying, based on the second set of parameters for the second event, a second subset of hashing processors executing the custom mempool protocol that is independent of the public blockchain protocol and compatible therewith, wherein the second subset of hashing processors is different from the first subset of hashing processors;

transmitting, by the application, the second event to the second subset of hashing processors executing the custom mempool protocol;

hashing the second event, by the second subset of hashing processors executing the custom mempool protocol, into the second block; and broadcasting the second block for appending to the blockchain data structure according to the public blockchain protocol.

* * * * *